Sept. 23, 1941.  A. P. FALL  2,256,944
ARM REST FOR MOTOR VEHICLES
Filed April 18, 1939   2 Sheets-Sheet 1
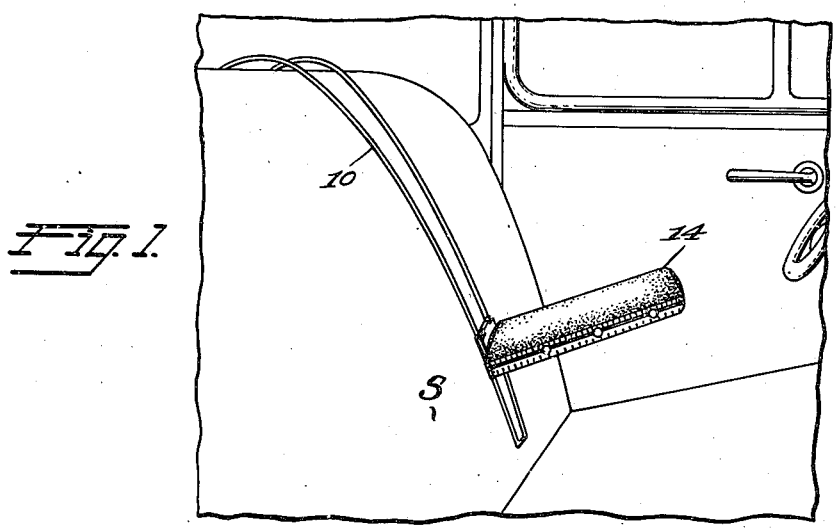
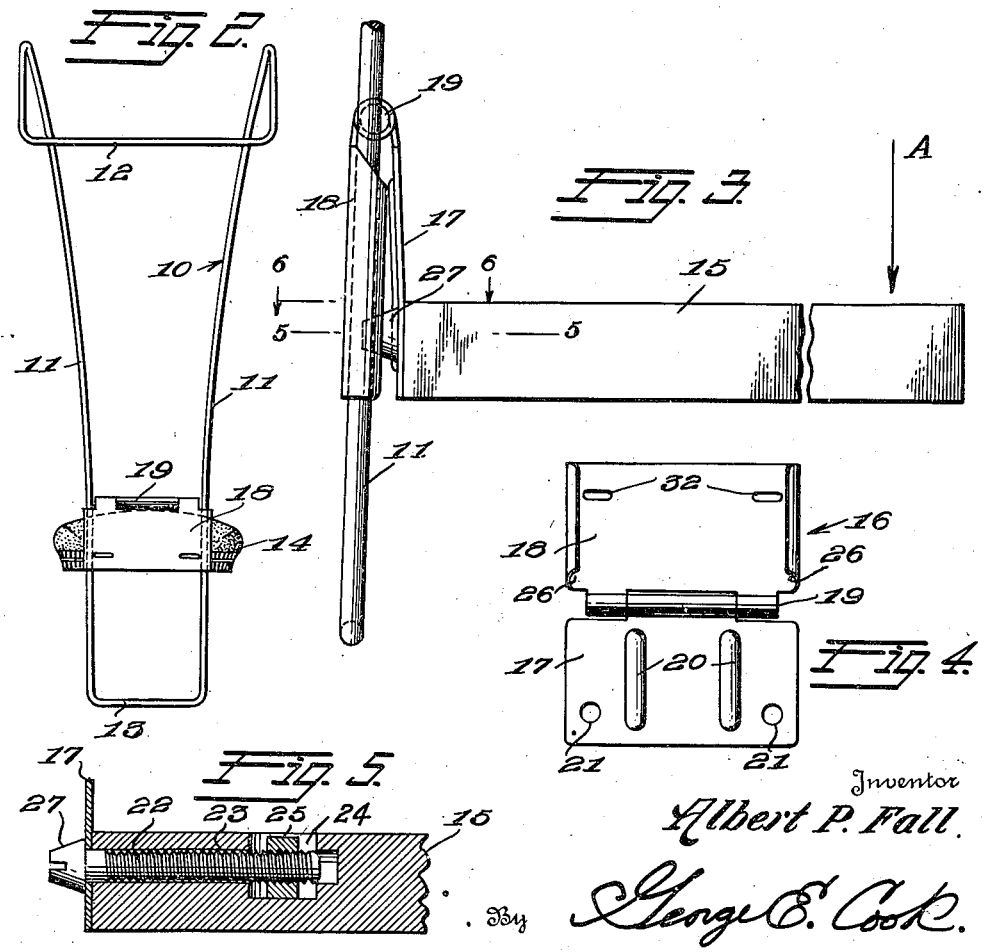
Inventor
Albert P. Fall
By George E. Cook.
Attorney Sept. 23, 1941.  A. P. FALL  2,256,944
ARM REST FOR MOTOR VEHICLES
Filed April 18, 1939  2 Sheets-Sheet 2

Inventor
Albert P. Fall
By George E. Cook.
Attorney

Patented Sept. 23, 1941

2,256,944

UNITED STATES PATENT OFFICE 2,256,944

ARM REST FOR MOTOR VEHICLES

Albert P. Fall, Toledo, Ohio

Application April 18, 1939, Serial No. 268,613

7 Claims. (Cl. 155—112)

This invention relates to an arm rest.

More particularly, the invention relates to an arm rest for detachable and adjustable connection with the seats of motor vehicles and is in general construction similar to the arm rest forming the subject-matter of my co-pending application, Serial Number 213,915, filed June 15, 1938, for Arm rest for motor vehicles.

A primary object of the invention is the provision of an arm rest comprising a bracket for detachable engagement with the back of a motor vehicle seat and an arm support adjustably connected with the bracket in such manner that it is locked in any desired adjusted position through weight imposed upon the support, as by an arm resting thereon.

A further object of the invention is the provision of an arm rest, which comprises a bracket for detachable engagement with the back of a motor vehicle seat and an arm support having a hinge connection with the bracket, the hinge connection providing for vertical adjustment of the support on the bracket and serving to lock the support in any adjusted position through weight of an arm on the support.

A still further object of the invention is the provision of an arm rest of the above-noted character, which is simple and durable in construction, adaptable to ready positioning on a motor vehicle seat in any desired position, capable of ready adjustment for maximum comfort in supporting an arm, capable of being swung to an inoperative position, and which is capable of manufacture and sale at relatively low cost.

For a more complete understanding of the nature and objects of the invention, reference will be had to the following detailed description, taken in connection with the accompanying drawings, wherein:

Fig. 1 is a perspective view of a portion of the interior of a motor vehicle disclosing an operative association of my improved arm rest with the motor vehicle seat;

Fig. 2 is a rear view of the improved arm rest in accordance with a preferred embodiment thereof;

Fig. 3 is a side elevation of same on an enlarged scale and being partially broken away;

Fig. 4 is an interior view of the improved hinge forming the connection between the bracket and support of the arm rest;

Fig. 5 is a fragmental vertical section in a plane substantially as represented by the line 5—5 in Fig. 3 and disclosing a preferred connection of the hinge with the support;

Figure 6:
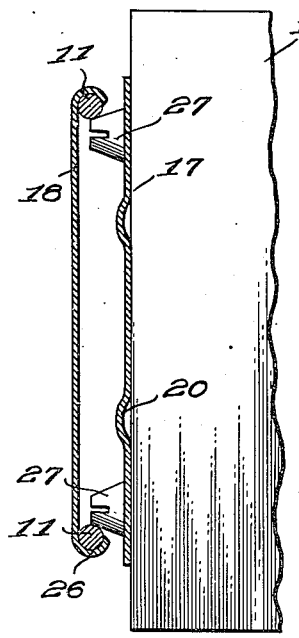
Fig. 6 is a horizontal section in a plane substantially as represented by the line 6—6 in Fig. 3.

Referring now in detail to the drawings by reference characters, and referring first to the preferred embodiment illustrated in Figs. 1 to 6, inclusive, 10 designates a bracket, which, as shown in Figs. 1 and 2, is of closed loop form and is preferably constructed from relatively heavy gauge wire. The bracket, as viewed in Fig. 2, comprises laterally spaced, upwardly diverging arms 11, which are curved as indicated in Fig. 1 for conformity with the back of the seat S and which, at their upper ends, are of hook form for engagement with the top of the seat back, the said upper ends merging into a transverse connecting portion 12. The arms 11 are yieldable and are connected at their lower ends by a transverse connecting portion 13.

An arm support 14 is hingedly and adjustably connected with the bracket 10 in a manner about to be described. The support 14 comprises a base member 15 which, for economy in manufacture, is preferably constructed from wood and is in the form of a rectangular plate, as indicated. The base member is preferably upholstered, as indicated in Figs. 1 and 2, to provide maximum comfort to an arm resting thereon.

The bracket 10 and support 14 are preferably of the construction disclosed in my co-pending application above referred to and in themselves present nothing novel in the present invention, the novelty residing in the connection between the bracket 10 and support 14.

Such connection is in the form of a hinge 16, illustrated in detail in Figs. 3 and 4, the hinge comprising the plates 17 and 18 hingedly connected at 19.

The plate 17 may be pressed out, as at 20, for reinforcing same and is provided with a pair of apertures 21 to receive screws for securing the hinge to the support base member 15.

The base member 15 is preferably constructed similarly to that in my aforesaid co-pending application for receiving the hinge-securing screws 22, such construction embodying a pair of laterally spaced horizontal bores 23, each of which is intersected by a vertical bore 24 of somewhat greater diameter, the bores 24 extending only partially through the base member 15 from the top thereof. A nut 25 is frictionally seated in each bore 24 with its internally threaded aperture in axial alignment with the bore 23 for receiving the screw 22. The bores 24 may, if desired, be closed, as by pouring molten lead, solder, or the like thereinto. However, they may be left as indicated in Fig. 5, inasmuch as the upholstery will cover same.

Thus, the hinge plate 17 is connected by a pair of screws 22 to the base member 15 with the plate substantially vertically disposed, as indicated in Fig. 3, the hinge connection 19 being at the top of the hinge and the other hinge plate 18 normally lying substantially parallel with the plate 17.

The plate 18 is provided at opposite sides thereof with inwardly curved portions forming substantially semi-circular guide channels 26 for slidable engagement of the bracket arms 11 therein, as is more clearly indicated in Fig. 6.

The screws 22 in this embodiment of the invention are each provided with a tapered or frusto-conical head 27 and such heads are so disposed as to exert a wedging action on the arms 11 upon closing of the hinge as effected by downward pressure on the base member 15, indicated by the arrow A in Fig. 3, whereby the arms are frictionally engaged between the walls of the guide channels 26 and the contacting portions of heads 27 and the base member 15 is locked against movement vertically of the bracket 10.

Thus, when an arm of an occupant of the vehicle is resting on the support 14, such support will maintain its vertically adjusted position.

Upon removal of pressure on the support 14, however, the support 14 may readily be adjusted by moving same upward or downward, the arms 11 sliding in the guide channels 26, and when the desired adjustment is made, pressure upon the support 14, as by resting an arm thereon, will automatically lock the support in such adjusted position, due to the wedging action of the screw heads 27.

The improved hinge not only provides for this novel adjustment but provides for swinging the support 14 upwardly into substantial parallelism with the bracket arms 11 when its use as a rest is not desired, or when an occupant desires to shift his position lengthwise of the seat without the necessity of completely removing the rest from the seat. However, the hooked upper end of the bracket 10 permits same to be readily shifted lengthwise of the seat or to be entirely removed therefrom.

Figure 7:
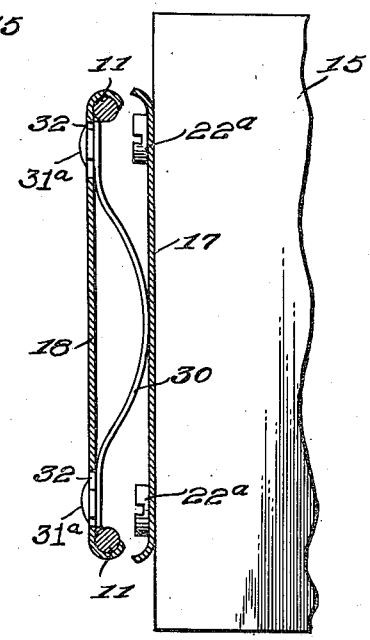
Fig. 7 is a view similar to Fig. 6 and depicting a modified construction.
Figure 8:
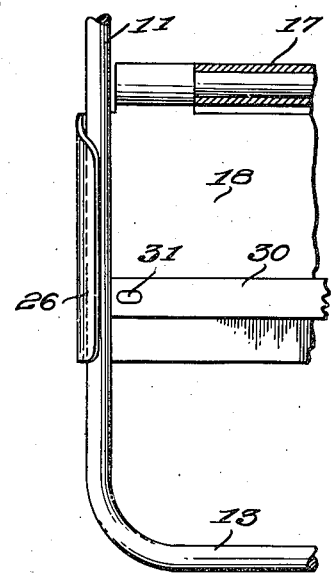
Fig. 8 is a fragmental view partially in elevation and partially in vertical section showing one of the hinge plates and its connection with one side of the bracket.

In accordance with the embodiment of the invention illustrated in Figs. 7 and 8, the hinge plate 17 is secured to the base member 15 by screws 22ᵃ, which are not provided with the frusto-conical heads and may be of common form.

In this form of the invention, the wedging action against the bracket arms 11 is effected by a bowed leaf spring 30, which is supported between the hinge plates 17 and 18, the free ends of the spring bearing against the arms 11 and having lugs 31 slidably received in slots 32 in the hinge plate 18, the lugs being headed as at 31ᵃ to maintain the spring in operative position.

The hinge plate 18, in the first form of the invention, may be provided with the slots 32, as indicated in Figs. 2 and 4, whereby the same hinge may be used with the screws 22 or the spring 30.

Upon downward pressure on the base member 15, the spring 30 will be compressed between the hinge plates 17 and 18, with the result that the expanding free ends thereof will wedge the arms 11 into frictional engagement with the walls of the guide channels 26 and thus lock the arm support 14 in any adjusted position.

Figure 9:
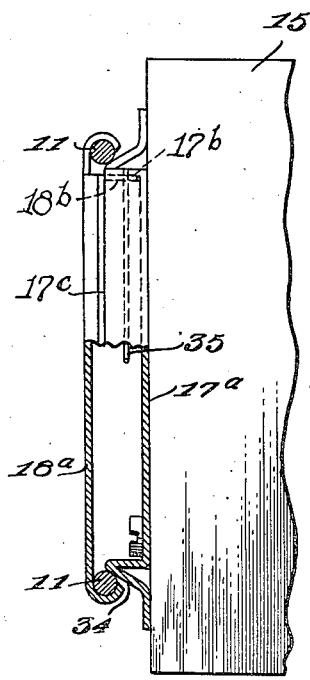
Fig. 9 is a view partially in top plan and partially in horizontal section depicting a still further embodiment of the invention.
Figure 10:
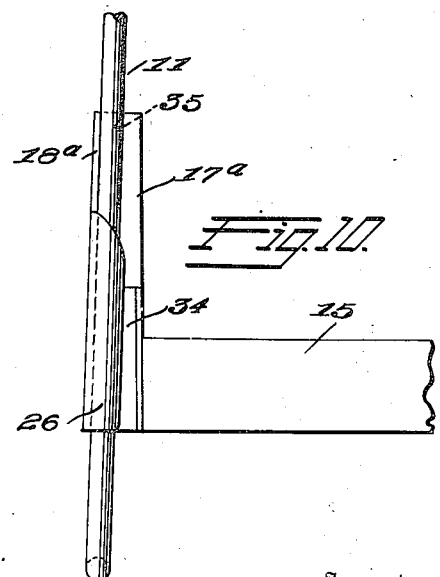
Fig. 10 is a broken side elevational view of the construction illustrated in Fig. 9.

The embodiment of the invention illustrated in Figs. 9 and 10 comprises a box-type hinge, including plates 17ᵃ and 18ᵃ. The plate 17ᵃ is reversely bent at each side thereof, providing integral wedging surfaces 34, which function in substantially the same manner as the screw heads 27 and spring 30.

The plates 17ᵃ and 18ᵃ of the box-type hinge are pivotally connected by a pin 35 extending through flanges 17ᵇ and 18ᵇ on the upper ends of plates 17ᵃ and 18ᵃ, the plate 17ᵃ having a top flange 17ᶜ.

The wedging surfaces 34 are not confined to the box-type hinge, but may be used with the form of hinge disclosed in Figs. 1 to 8, inclusive.

Furthermore, a box-type hinge may be used with the screws 22 or spring 30.

It will be readily appreciated from the foregoing disclosure that an arm rest is provided by the present invention which substantially fulfills the maximum requirements of devices of this character in that the rest, as a whole, is capable of being readily positioned at any desirable location on a motor vehicle seat, the arm support is pivotally connected with the bracket whereby it may readily be swung to an out-of-the-way position, and the hinge connection between the support and bracket provides a readily adjustable connection and the support is automatically locked in any desired adjusted position through the weight of an arm resting thereon.

While I have disclosed certain specific embodiments of my invention, same are to be considered as illustrative only, and not restrictive, the scope of the invention being defined in the subjoined claims.

What I claim as new and desire to secure by U. S. Letters Patent is:

1. An arm rest comprising a bracket and an arm support, the bracket comprising a pair of yieldable arms, a hinge comprising a pair of plates one of which is secured to the support and the other of which is provided with a pair of guide channels receiving said arms for sliding said support on said bracket for vertically adjusting same, and means interposed between the plates for wedging the arms outwardly into frictional contact with the walls of said guideways upon closing said plates as induced by the weight of an arm on said support for locking same in adjusted position.

2. The structure defined in claim 1, wherein said means comprise a pair of frusto-conical heads on screws securing said first plate to the support.

3. The structure defined in claim 1, wherein said means comprise a bowed leaf spring having its opposed ends slidably connected with one of said plates for pressure engagement of said ends with said arms upon compression of the spring between the plates.

4. The structure defined in claim 1, wherein said means comprise portions providing a pair of wedging surfaces on the first-named plate.

5. An arm rest comprising a bracket and an arm support, the bracket including a pair of spaced flexible arms, a hinge connection between the bracket and support and including guide channels receiving the arms for adjustable movement of the support lengthwise of the arms, and means disposed between the arms and operative by hinging movement of the support as induced by weight of an arm thereon for forcing said arms in opposite directions into frictional locking engagement with said guide channels.

6. An arm rest comprising a bracket and an arm support, the bracket including a pair of spaced flexible arms having means for substantially vertical suspension thereof from a support, a plate having guide channels opening toward each other and receiving said arms for adjustable movement of the plate lengthwise of the arms, a hinge connection between the arm support and plate for movement of the arm support into substantially horizontal operative position or into inoperative position substantially parallel with the arms, and means engageable with the inner sides of the arms and operative to force the arms apart into frictional locking engagement with the guide channels upon hinging movement of the arm support into operative position.

7. An arm rest comprising a bracket and an arm support, the bracket including a pair of laterally spaced flexible arms, a hinge including a pair of plates one of which is secured to the support and the other of which is provided with guide channels slidably engaged by the arms for adjustment of the support relation to the bracket, and means on one of the plates operative upon hingedly closing the plates for spreading the flexible arms into frictional locking engagement with the guide channels thereby preventing movement of the support relative to the bracket.

ALBERT P. FALL.